Patented Jan. 2, 1940

2,185,954

UNITED STATES PATENT OFFICE 2,185,954

IMPREGNATION OF PAPER OR OTHER MATERIALS, MORE ESPECIALLY FOR THE PROTECTION OF VEGETABLE AND ANIMAL GOODS DURING STORAGE

Arthur Ryner, London, England, assignor to Preservators Limited, London, England, a company of Great Britain No Drawing. Application September 29, 1937, Serial No. 166,457. In Great Britain October 2, 1936

11 Claims. (Cl. 91—68)

This invention relates to the protection of vegetable and animal goods during storage.

It has already been proposed to protect such goods by imparting a controlled and limited alkalinity to the atmospheric air surrounding the goods during storage. The pH value of the air is preferably maintained at about 7.5 and this is achieved by diffusing a gaseous alkaline substance into the atmosphere, as for example, by burning combustible porous bodies which have previously been impregnated with a substance which yields a gaseous alkali, by allowing gaseous ammonia to escape from a bottle of liquefied ammonia, by spraying or evaporating amines or solutions thereof into the atmosphere or by placing in the storage chamber heaps of a substance, such as ammonium carbonate, which gives off a gaseous alkali under normal conditions.

The means which have been proposed for imparting the desired alkalinity to the air, while suitable for use on a large scale, are such that small tradesmen and individual householders are practically precluded from availing themselves of the use of the process for protecting small stores of vegetable and animal goods.

An important object of the invention is to provide improved means whereby users on both a large and small scale may conveniently and safely employ the process referred to above, such means being supplied ready for use and needing no preparation by the user while not involving the risk of fire or contamination of the goods to be preserved.

A further object of the invention is to provide means which shall be such as to repel flies and insects from the neighborhood of the stored goods and yet another object is the provision of an improved method of producing the means according to the invention.

According to the invention there is provided a paper or other carrier or base impregnated or coated with a substance adapted to evolve an alkaline gas under the conditions of use, the impregnating or coating substance being such that the impregnated or coated base or carrier is normally quiescent and only evolves the alkaline gas when subjected to the action of carbon dioxide evolved by the stored goods.

Other features of the invention will appear from the following description of some examples of the way in which it may be carried into effect and are detailed in the claims appended to this specification.

The production of paper or like carriers or bases adapted to give off an alkaline gas will first be described.

In view of the fact that paper is subject to deterioration, especially if it be thin, when soaked for a long period in a solution and since it is important that the impregnating or coating substances firmly adhere to the paper and produce the maximum loading thereof, it is preferred to impregnate the paper by passing it through a hot saturated solution of the desired substance. The solution is maintained at saturation point and the preferred temperature is about 70° C. It is found that the hot solution penetrates in to the paper in a relatively short time and that the latter rapidly dries, after leaving the solution, while being traversed through the air and/or subjected to the drying effect of a current of air. Heating of the impregnated paper should be avoided as much as possible since it causes rapid evolution of the alkaline gas.

When it is desired to repel flies and insects from the foodstuffs being preserved the paper or the like may be impregnated or coated with ammonium formate or ammonium lactate or one side of the paper or the like may be coated with one of the substances yielding an alkaline gas and the other side may be coated with formic acid or lactic acid, applied in solution. Again the foodstuff may be wrapped or loosely enclosed in an inner covering impregnated with a substance yielding an alkaline gas and an outer covering impregnated with a substance which repels flies and insects. In some cases both classes of substances may be applied to a common base, e. g., paper, over adjacent areas.

In order that the efficiency of the preserving process may be checked conveniently and easily there may be provided, either on a separate card or the like or on an edge of the paper which has not been impregnated with the substance referred to above, a series of sensitive indicators adapted to change colour in dependence upon the alkalinity of the air. For example, three small pieces of paper (or three areas of the margin of the wrapping paper prepared as above described) may be impregnated respectively with the following solutions:

(a) A 0.04% solution of brom-cresol-purple in iso-propyl alcohol, (b) A 0.02% solution of phenol-red in iso-propyl alcohol, and (c) A 0.04% solution of brom-thymol-blue in iso-propyl alcohol.

Initially these impregnated pieces or areas of paper are of substantially the same yellowishbrown colouration but as soon as they are placed in an alkaline atmosphere the paper impregnated with solution (a) becomes coloured a deep blue-violet. If the pH value of the atmosphere is approximately 7.5 the paper impregnated with solution (b) becomes coloured a rose-pink but should this value be greatly exceeded the paper impregnated with solution (c) becomes coloured a pale almond-green. It will be understood that these colour changes all occur to varying degrees for degrees of alkalinity of the atmosphere varying from zero upwards and that reference to a suitably calibrated colour chart permits of a close approximation to the degree of alkalinity of the atmosphere prevailing at any instant.

Such a chart could be printed on the impregnated paper or the like or supplied therewith and directions for use and other matter may also be printed on or otherwise applied to the packing or wrapping material according to the invention.

According to the invention, the carbon dioxide which all vegetable and animal goods evolve during storage is utilised as a controlling factor for the dissemination of the alkaline gas so as to maintain the pH value of the air surrounding the goods substantially constant at 7 or thereabouts.

The means provided for this purpose, therefore, is such that evolution or generation of the gas imparting alkalinity to the atmosphere only takes place in the presence of carbon dioxide and proportionately to the concentration thereof.

To this end, the paper, packing material or another suitable base is impregnated or coated with a substance adapted to be decomposed by, or to react chemically with, carbon dioxide with the simultaneous liberation of gaseous ammonia. Examples of such substances are the known complex compounds of metals with ammonia and acid radicals, such as those believed to have the formulae $(Cu(NH_3)_4)CO_3$ and $(Ca(NH_3)_4)CO_3$. These compounds evolve ammonia in the presence of carbon dioxide, presumably with the formation of other complex compounds in which one or more of the $NH_3$ groups has or have been substituted by a $CO_2$ group.

It is preferred to form the complex compounds in situ in the pores or on the fibres of the paper or the like, more especially when they are insoluble or only slightly soluble, but when the complex compounds are soluble they may be applied in solution by any suitable impregnating or coating process.

The complex compounds may be produced by any of the usual methods which form no part of the present invention.

Paper or the like which has been impregnated or coated with a substance of the character referred to may be stored for long periods without deterioration yet is so sensitive to the presence of $CO_2$ that if breathed upon from a distance of about two feet sufficient ammonia gas is liberated for its characteristic odour to be easily recognised. The paper or the like may be wrapped around the goods to be protected, used as a lining to crates, baskets or boxes for the said goods or employed in other ways.

It is desirable in many instances to protect the paper or the like from the action of damp or moisture and for this purpose there may be applied an outer covering or coating of a waterproof material, e. g., a waterproof varnish, a cellulose lacquer, a cellulose acetate film or the like. In order that the dissemination of the alkaline gas may still occur in the presence of $CO_2$, however, the paper or the like is perforated subsequent to the waterproofing treatment so that the impregnated material will be freely exposed at the walls of the perforations.

The perforations also serve to permit of ventilation of the goods being protected since they allow of the circulation of air. By suitably proportioning the sizes of the perforations with relation to the thickness of the paper or the like there may be obtained a degree of automatic regulation of the ventilation.

Furthermore the area of paper or the like available for the dissemination of the alkaline gas may be exactly determined, and may even be increased to a value exceeding the combined area of the outer surfaces of the paper or the like, by suitably selecting the size and number of the perforations. For example, a sheet of paper, which has been impregnated and waterproofed in the manner described, may be formed with a large number of closely spaced small holes of a diameter approximating in length to the thickness of the paper. The total area of the walls of the holes then amounts to approximately 50% more than the total area of the two surfaces of the sheet. At the same time the perforations are so small that moisture cannot penetrate them.

In order to increase the effective area for the dissemination of the gas, or to concentrate the desired effect at a predetermined location, the paper or other carrier or base may be corrugated, creped, crinkled or folded either over its entire expanse or over a part thereof, as the case may be.

What I claim is:

1. Wrapping, packing and like materials for use in association with vegetable and animal goods to protect them during storage comprising a carrier material carrying a complex compound of a metal with ammonia and an acid radical which evolves ammonia when subjected to the action of carbon dioxide.

2. For use in association with vegetable and animal goods to protect them during storage, a carrier material impregnated, at least on one side, with a complex compound of a metal with ammonia and an acid radical which evolves ammonia when subjected to the action of carbon dioxide.

3. A carrier material for association with vegetable and animal goods during storage thereof consisting of a packing material which carries a complex compound of a metal with ammonia and an acid radical, the said compound evolving ammonia under the action of carbon dioxide, and which is provided with a waterproof coating to protect it against the action of damp.

4. A carrier material as claimed in claim 3, formed with perforations to ensure the ventilation of the goods.

5. A carrier material as claimed in claim 1, formed with folds and creping to increase its effective area.

6. A carrier material as claimed in claim 1, which includes a substance such as lactic acid which is shunned by flies and insects.

7. A wrapper for use with vegetable and animal goods during the storage thereof comprising a packing material carrying a complex metal-ammonia compound which liberates ammonia under the action of carbon dioxide.

8. A wrapping paper for vegetable and animal goods which is impregnated with a complex metal-ammonia compound adapted to evolve ammonia under the action of carbon dioxide.

9. A wrapper as claimed in claim 7, formed with perforations to ensure ventilation of the goods.

10. A wrapping paper as claimed in claim 8, formed with folds and creping to increase its effective area.

11. A carrier material as claimed in claim 3, embodying as the ammonia evolving compound a complex copper-ammonium salt.

ARTHUR RYNER.